US012691832B1

(12) United States Patent
Wang et al.

(10) Patent No.: US 12,691,832 B1
(45) Date of Patent: Jul. 28, 2026

(54) INTEGRATED VEHICLE RACK

(71) Applicant: Ningbo Innrack Technology Co., Ltd.,
Ningbo City (CN)

(72) Inventors: Yufeng Wang, Ningbo City (CN); Ning Liu, Ningbo City (CN)

( * ) Notice: Subject to any disclaimer, the term of this patent is extended or adjusted under 35 U.S.C. 154(b) by 0 days.

(21) Appl. No.: 19/294,710

(22) Filed: Aug. 8, 2025

(30) Foreign Application Priority Data

Jul. 30, 2025 (CN) .......................... 202521603974.9

(51) Int. Cl.
B60R 9/10 (2006.01)

(52) U.S. Cl.
CPC ...................................... B60R 9/10 (2013.01)

(58) Field of Classification Search
CPC .......................... B60R 9/10; B60R 2011/0085
USPC ......................................... 224/504–508, 924
See application file for complete search history.

(56) References Cited

U.S. PATENT DOCUMENTS

| | | | | |
|---|---|---|---|---|
| 5,685,469 A * | 11/1997 | Stapleton | .................. | B60R 9/10 |
| | | | | 224/536 |
| 6,968,986 B1 * | 11/2005 | Lloyd | ....................... | B60R 9/06 |
| | | | | 224/511 |
| 7,410,082 B2 * | 8/2008 | Stewart | ..................... | B60R 9/06 |
| | | | | 224/512 |
| 7,854,359 B2 * | 12/2010 | Gunn | ........................ | B60R 9/10 |
| | | | | 411/513 |

| | | | | |
|---|---|---|---|---|
| 8,141,760 B2 * | 3/2012 | Kuschmeader | ........... | B60R 9/06 |
| | | | | 280/506 |
| D727,831 S * | 4/2015 | Eriksson | ....................... | D12/407 |
| 9,022,265 B2 * | 5/2015 | Wolfe | ..................... | B60P 3/077 |
| | | | | 224/403 |
| D790,434 S * | 6/2017 | Adler | ........................... | D12/408 |
| 10,093,243 B2 * | 10/2018 | Shen | ......................... | B60R 9/10 |
| 10,351,070 B2 | 7/2019 | Badillo | | |
| 10,668,866 B2 * | 6/2020 | Kuschmeader | ........... | B60R 9/10 |
| 11,046,379 B2 * | 6/2021 | Tsai | ......................... | B62H 3/00 |
| 11,148,607 B1 * | 10/2021 | Hsieh | ...................... | B60R 9/045 |
| 11,390,222 B2 * | 7/2022 | Prescott | .................... | B60R 9/10 |
| 11,427,045 B2 * | 8/2022 | Bowles | ..................... | B60R 9/10 |
| 11,511,677 B2 * | 11/2022 | Peng | ......................... | B60R 9/10 |
| 11,584,307 B2 * | 2/2023 | Prescott | .................... | B60R 9/10 |
| 11,993,229 B2 * | 5/2024 | Liu | ............................. | B60R 9/10 |
| 11,999,319 B2 * | 6/2024 | Prescott | .................... | B60R 9/06 |
| D1,068,625 S * | 4/2025 | Wang | ........................... | D12/407 |
| 12,409,788 B1 * | 9/2025 | Wang | ......................... | B60R 9/10 |
| 2005/0056672 A1 * | 3/2005 | Stewart | ..................... | B60R 9/06 |
| | | | | 224/504 |
| 2018/0001830 A1 * | 1/2018 | Olaison | ..................... | B60R 9/10 |

(Continued)

*Primary Examiner* — Justin M Larson
(74) *Attorney, Agent, or Firm* — Tsz Lung Yeung

(57) ABSTRACT

An integrated vehicle rack may include a plastic wheel support for supporting the bicycle wheels, a flip locking device for flipping the plastic wheel support, and a square-mouth connecting device for connecting an external vehicle, wherein the plastic wheel support and the square-mouth connecting device are both connected to the bottom of the flip locking device; the flip locking device comprises a lower bracket, an upper bracket, a flip structure, and a locking structure. The square-mouth connecting device comprises a square-mouth tube and a connecting device. The flip locking device allows the user to easily lock or unlock the upper bracket and the lower bracket without tools, which facilitates the opening of the trunk door and greatly improves the flexibility of use and user experience.

5 Claims, 14 Drawing Sheets

(56)            References Cited

U.S. PATENT DOCUMENTS

2021/0170955 A1*   6/2021   Nusbaum .................. B60R 9/06
2022/0203903 A1*   6/2022   Wang ........................ B60R 9/06
2023/0202403 A1*   6/2023   Wang ........................ B60R 9/06
                                                                224/549

* cited by examiner

10

20

30

INTEGRATED VEHICLE RACK

FIELD OF THE INVENTION

The invention relates to the technical field of trailer racks, and in particular to an integrated vehicle rack.

BACKGROUND OF THE INVENTION

A trailer rack is a device mounted at the rear of a car, mainly used to carry larger items such as bicycles, solving the problem of limited space in the trunk of a car and being unable to carry large items, which can effectively extend the vehicle's carrying capacity. The wheel support, an important component in the trailer rack, can firmly support the bicycle wheels, ensure safety and stability during transportation, and facilitate users to carry bicycles for outdoor travel or daily travel. However, there are also some shortcomings in the use of trailer racks. For example, when a bicycle is loaded on a trailer rack, it often occupies the opening space of the trunk of the car, causing the trunk door to be unable to open normally. When users need to open the trunk, they often have to unload the trailer rack or bicycle first, and then open the trunk door, which not only increases the complexity and time cost of the operation, but also affects the convenience of use and the overall experience.

SUMMARY OF THE DISCLOSURE

In view of this, the present invention provides an integrated vehicle rack, aiming to solve the problem that the existing trailer rack hinders the normal opening of the trunk door of the car.

The present invention provides an integrated vehicle rack, including a plastic wheel support, a flip locking device for flipping the plastic wheel support, and a square-mouth connecting device for connecting to an external vehicle, wherein the plastic wheel support and the square-mouth connecting device are both connected to a bottom of the flip locking device;

The flip locking device comprises a lower bracket, an upper bracket, a flip structure and a locking structure; wherein one end of the upper bracket is hinged to one end of the lower bracket through the flip structure, the locking structure comprises a latch and a locking member, the latch is provided through two end of the upper bracket, the locking member is arranged at one end of the upper bracket, the locking member is provided with a first locking hole for the latch to be inserted, the latch is provided with a first limiting column, one end of the upper bracket is movably connected to a driving frame, the top of the driving frame is provided with a movable groove for the latch to move, both sides of the driving frame is provided with a through limiting waist hole for the first limiting column to be movably connected, a driving part is formed at the bottom of the driving frame, so as to enable the first limiting column to drive the latch to move telescopically in the length direction, and upper bracket and the lower bracket can be locked or unlocked by the cooperation of the latch and the first locking hole; besides, the driving part comprises two bending plates, the driving frame and the driving part are in an L-shaped structure, and a foot-operated part is provided between the two bending plates;

The square-mouth connecting device comprises a square-mouth tube and a connecting device; wherein a second locking hole is provided at the diagonal of the square-mouth tube, the connecting device comprises an connecting tube, a mounting bracket and a locking mechanism, one end of the connecting tube is connected to the mounting bracket, the other end of the connecting tube is provided with a moving square hole, the locking mechanism comprises a first expansion block, a second expansion block and a driving rod, the first expansion block is provided with a first inclined plane, the second expansion block is provided with a second inclined plane and a locking part, the first inclined plane and the second inclined plane are fitted with each other, the first expansion block is slidably connected in the connecting tube and is rotatably connected to the driving rod, the mounting bracket is provided with a driving nut for threading the driving rod to drive the locking part to be telescopically moved in the moving square hole, the portion of the locking part exposed from the moving square hole is provided with a horizontal plane and a vertical plane perpendicular to each other, both the horizontal surface and the vertical surface are contacted with the inner wall of the square-mouth tube, the inner wall of the second locking hole is symmetrically provided with two locking plates, and the opposite sides of the two locking plates are contacted with the locking part.

In a possible embodiment, the flip structure includes two first hinges and two second hinges, the two first hinges are respectively fixed to two sides of one end of the upper bracket by bolts, the first hinges are hinged to one end of the lower bracket, each of the second hinge includes a connecting part and a moving part, the two connecting parts are hinged to the middle part of the upper bracket and are symmetrically arranged, the middle part of the lower bracket is symmetrically arranged with two moving members, and each of the moving part is provided with a moving groove for the sliding connection of the moving member along the length direction.

In a possible embodiment, a mounting support and a rotating shaft are provided at one end of the upper bracket, the latch is provided provided on the mounting support, a first rotating hole is provided below the limiting waist hole of the driving frame, a second rotating hole is provided through the bottom of the mounting support, and the rotating shaft is rotatably connected to the first rotating hole and the second rotating hole;

The locking structure further includes a holding mechanism, which acts between the first limiting column and the mounting support, in order to make the latch extend outward from the other end of the upper bracket and be inserted into the locking hole; the said holding mechanism is a spring member and is sleeved on the latch, a first contact ring is sleeved at the latch corresponding to the first limiting column and the mounting support, and two ends of the holding mechanism are respectively contacted with the mounting bracket and the first contact ring.

In a possible embodiment, the first inclined plane and the second inclined plane are parallel to the diagonal line of the moving square hole corresponding to the inner cavity section of the square-mouth tube, the connecting tube is a square tube structure, the moving square hole is provided at any diagonal position of the inner wall of the connecting tube, the other diagonal position of the inner wall of the connecting tube relative to the moving square hole is in contacted with the first expansion block, the inner wall of the moving square hole is provided with two guide plates, and two sides of the locking part are respectively in contacted with the two guide plates.

In a possible embodiment, the first expansion block is provided with a third rotating hole for the rotatably connection of the driving rod, two limiting members are provided at two openings of the third rotating hole corresponding to the driving rod, a mounting groove is provided on a side wall of the first expansion block away from the mounting bracket, the mounting groove is connected with the rotating hole, each of the limiting member is provided with a gasket sleeved on the driving rod, the two gaskets are respectively in contacted with the side wall of the second expansion block and the inner groove wall of the mounting groove, and the outer diameter of the gasket is larger than the inner diameter of the third rotating hole.

Compared with the prior art, the beneficial effects of the present invention are: an integrated vehicle rack, including a plastic wheel support for supporting the bicycle wheels, a flip locking device for flipping the plastic wheel support, and a square-mouth connecting device for connecting to an external vehicle, wherein the plastic wheel support and the square-mouth connecting device are both connected to the bottom of the flip locking device. The flip locking device includes a lower bracket, an upper bracket, a flip structure and a locking structure, the lower bracket is connected to the rear of the car, the upper bracket is hinged to the lower bracket through two first hinges, when the upper bracket and the lower bracket are in a folded state, the latch is inserted into the first locking hole to lock the folded state of the upper bracket and the lower bracket, so that users can load bicycles, luggage and other items on the upper bracket. When the user needs to open the trunk at the rear of the vehicle, the user steps on the foot-operated part to enable the limiting waist hole to drive the first limiting column, the latch approaches the side close to the mounting support, and the latch is pulled out of the first locking hole to unlock the upper bracket and the lower bracket, in this way, the user can flip the upper bracket outward to provide space for the opening of the trunk door. In this process, the user can lock or unlock the upper bracket and the lower bracket without using tools, which is convenient to operate and improves the user experience. The square-mouth connection device comprises a square-mouth tube and a connection device, a second locking hole is provided at the diagonal of the square-mouth tube, the connecting device comprises an connecting tube, a mounting bracket and a locking mechanism, and the connecting tube and the mounting bracket are detachable connected through the locking mechanism. The user only needs to rotate the handwheel to drive the first expansion block to slide in the connecting tube through the threaded connection between the driving nut and the driving rod, so that the first expansion block slides in the connecting tube to approach or move away from the second expansion block, and locking part is switched between the locking position and the unlocking position through the fitting of the second inclined plane and the first inclined plane. In this way, the first expansion block and the second expansion block form a diagonal tension to ensure that the connecting tube and the mounting bracket are tightly connected, thereby improving the connection stability of the square-mouth connection device. The handwheel allows the quickly disassembly and assembly of the square-mouth connection device without tools, which is convenient to operate and improves the convenience of disassembly and assembly under limited outdoor conditions. In summary, the integrated vehicle rack realizes a design with a compact structure and convenient operation by integrating a plastic wheel support, a flip locking device and a square-mouth connection device. Firstly, the flip locking device allows the user to easily lock or unlock the upper bracket and the lower bracket without tools, which facilitates the opening of the trunk door and greatly improves the flexibility of use and user experience. Secondly, the square-mouth connecting device adopts an inclined expansion structure and a hand wheel, enhance the stability of the connection and the convenience of disassembly and assembly, and is particularly suitable for use under limited outdoor conditions. The overall design effectively solves the problem of traditional trailer racks hindering the opening of the trunk door, and improves the practicality and user satisfaction of the trailer rack.

DETAILED DESCRIPTION OF THE PREFERRED EMBODIMENTS

Other features, objects and advantages of the present invention will be more clearly and completely by the detailed description of the non-limiting embodiments with reference to the attached drawings (FIG. 1 to FIG. 14). Obviously, the described embodiments are only part of the embodiments of the present invention, but not all of them. Based on the embodiments of the present invention, all other embodiments obtained by ordinary technicians in the field without creative labor are within the scope of the present invention.

In the present invention, the use of orientation words such as "upper, "lower", "bottom" are only for the convenience of description, rather than indicating or implying the specific orientation, therefore it should not be construed as being limited to the description of the following embodiments.

In addition, it should be noted that the terms "first", "second", "third" and the like in the description and claims of the present invention and the above drawings are used to distinguish similar objects, which are not necessarily used to describe the specific order or sequence. It is to be understood that the data so used are interchangeable under appropriate circumstances in order to describe the embodiments of the invention herein.

Figure 1:
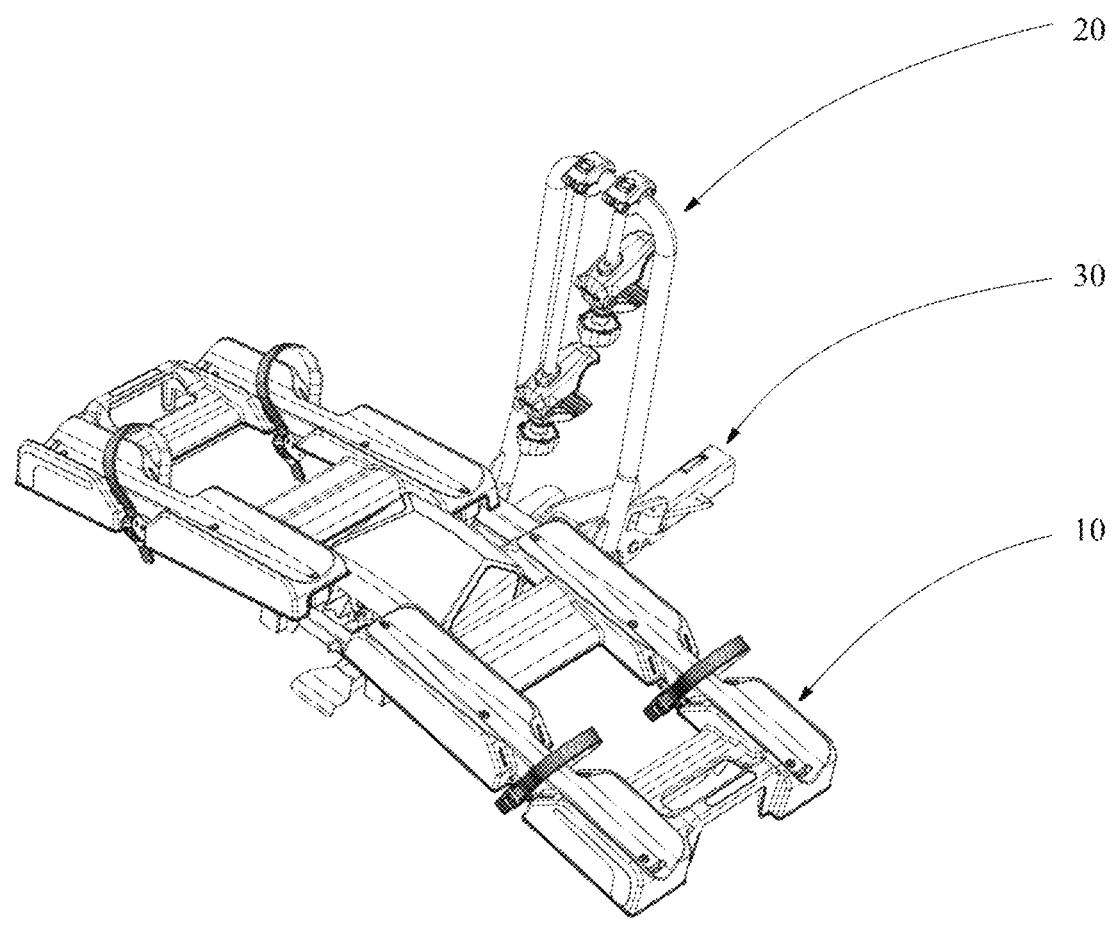
FIG. 1 is a schematic structural view of an integrated vehicle rack in a non-flipped state.
Figure 2:
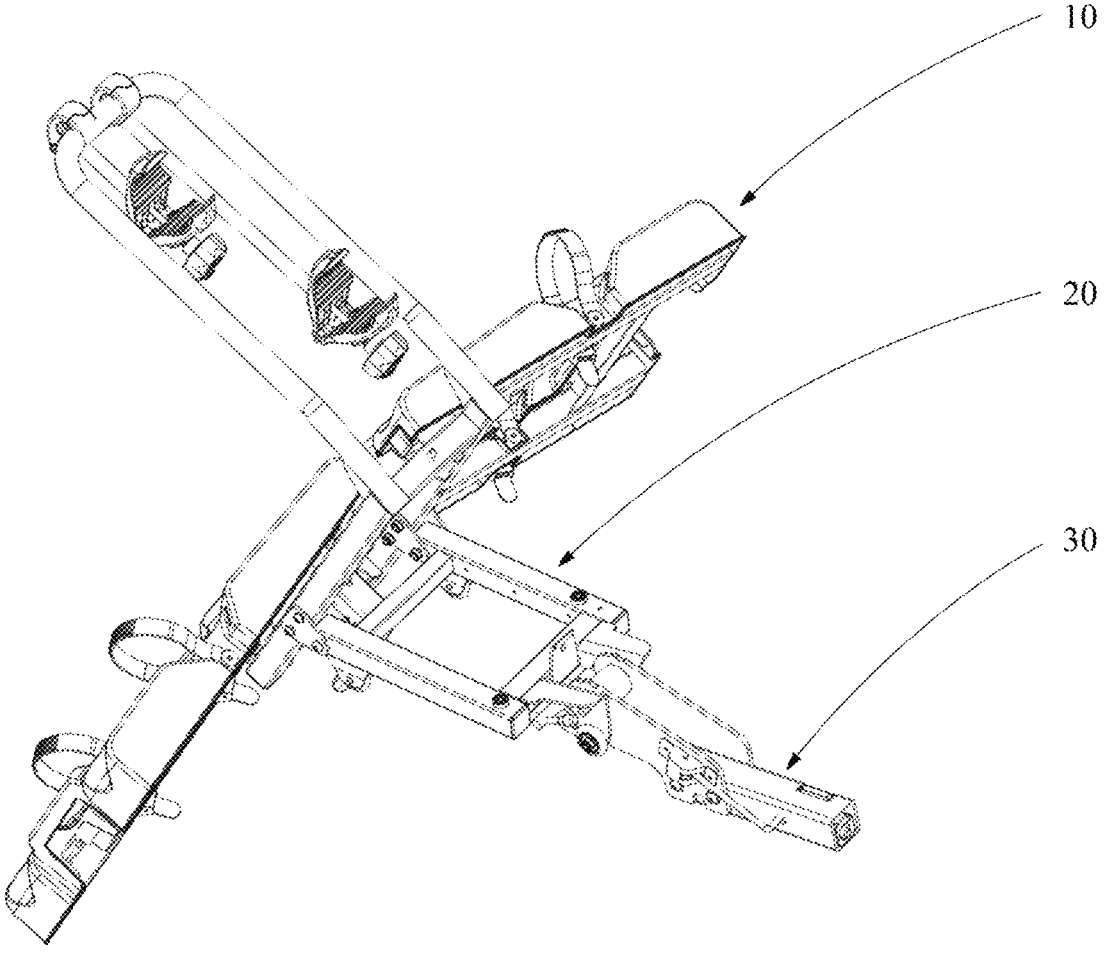
FIG. 2 is a structural disassembly view of an integrated vehicle rack in a flipped state.
Figure 3:
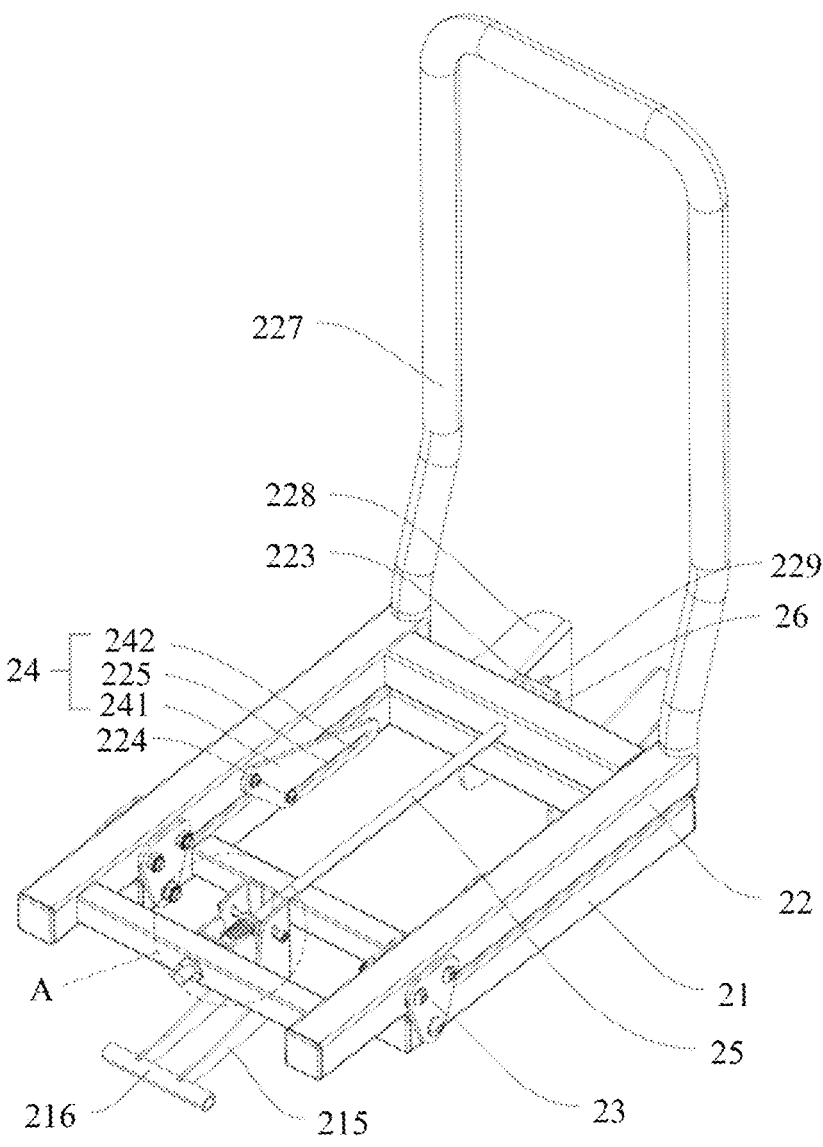
FIG. 3 is a schematic structural view of a flip locking device.
Figure 4:
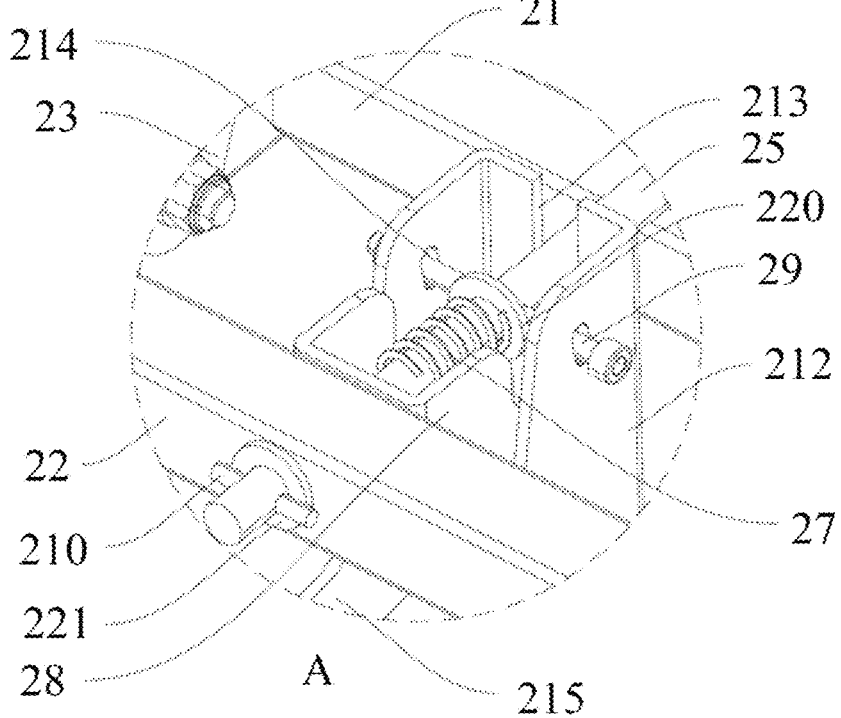
FIG. 4 is an enlarged view of zone A in FIG. 3.
Figure 5:
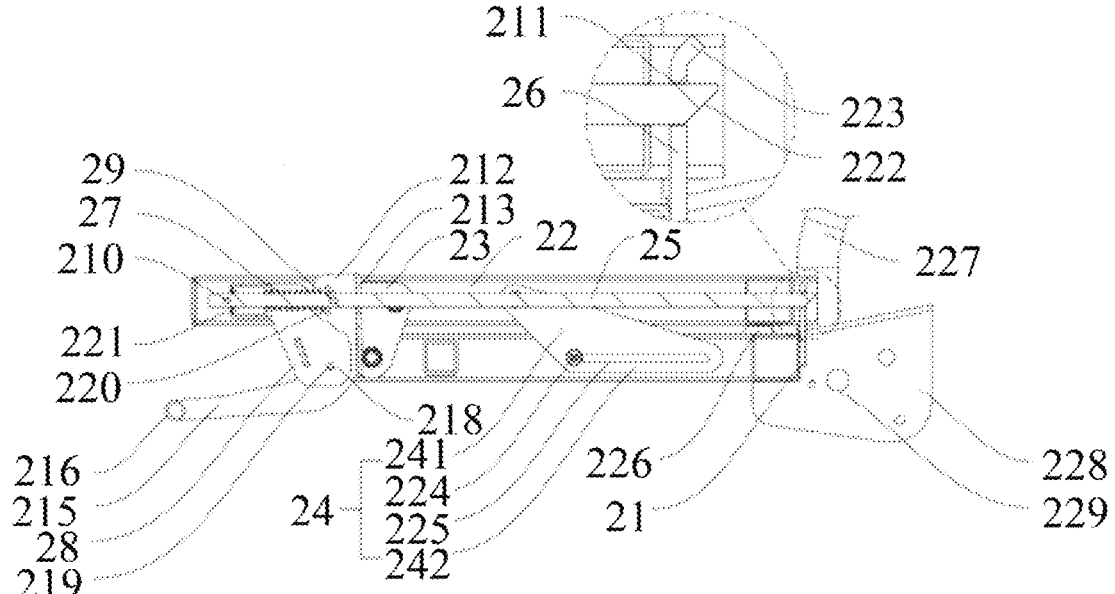
FIG. 5 is a structural cross-sectional view of the flip locking device when the locking structure is in a locked state.
Figure 6:
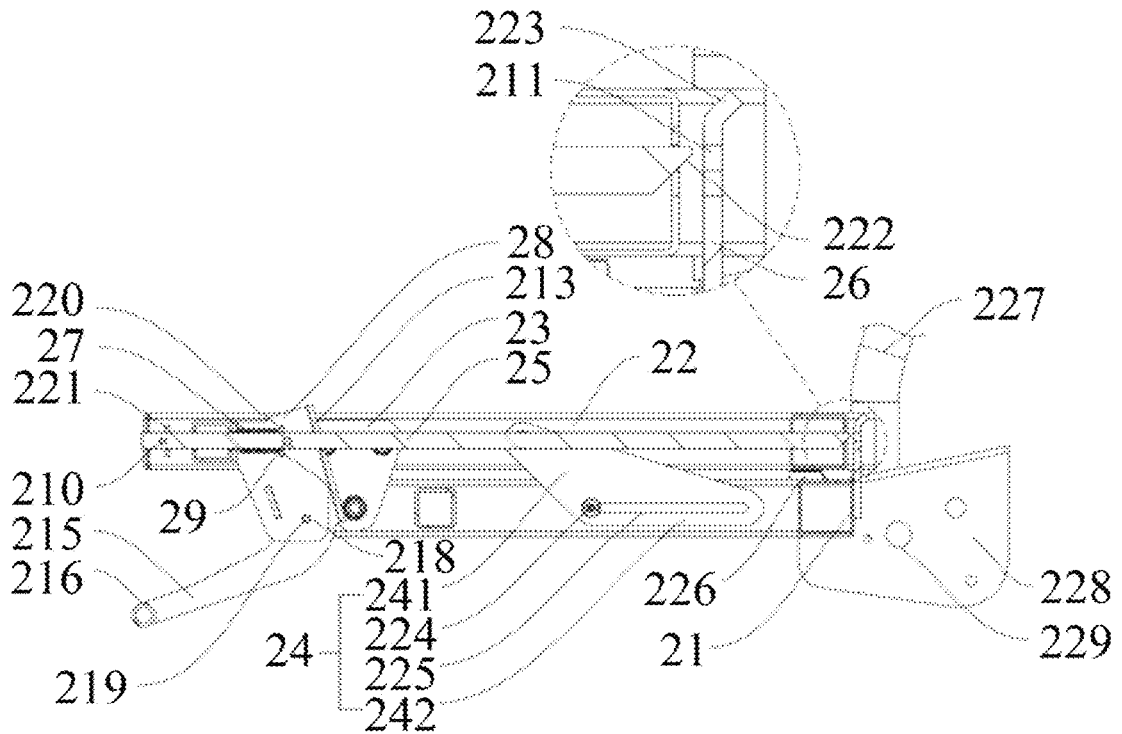
FIG. 6 is a structural cross-sectional view of the flip locking device when the locking structure is in an unlocked state.
Figure 7:
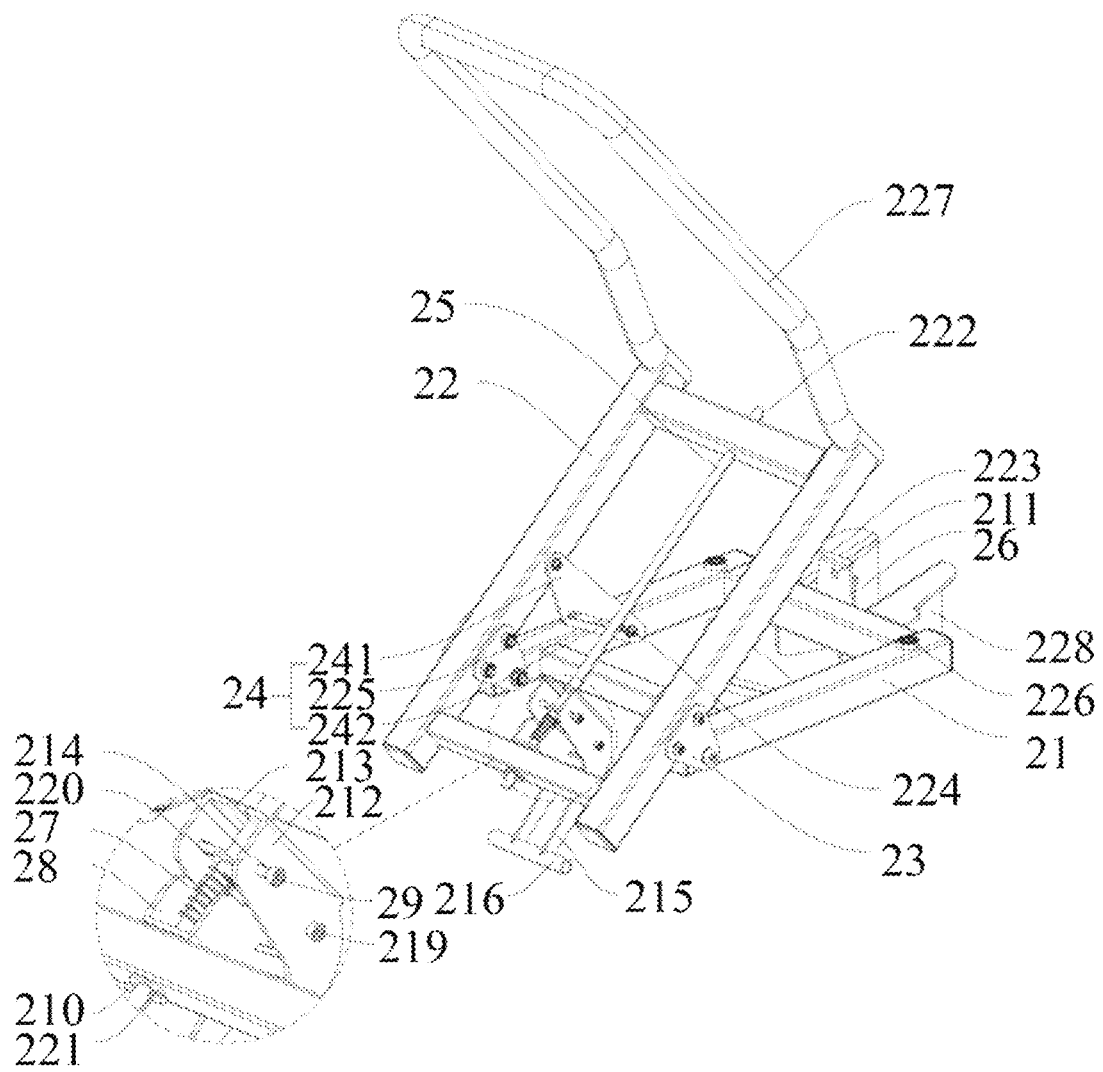
FIG. 7 is a schematic structural view of the flip locking device when the upper bracket and the lower bracket are in an unfolded state.
Figure 8:
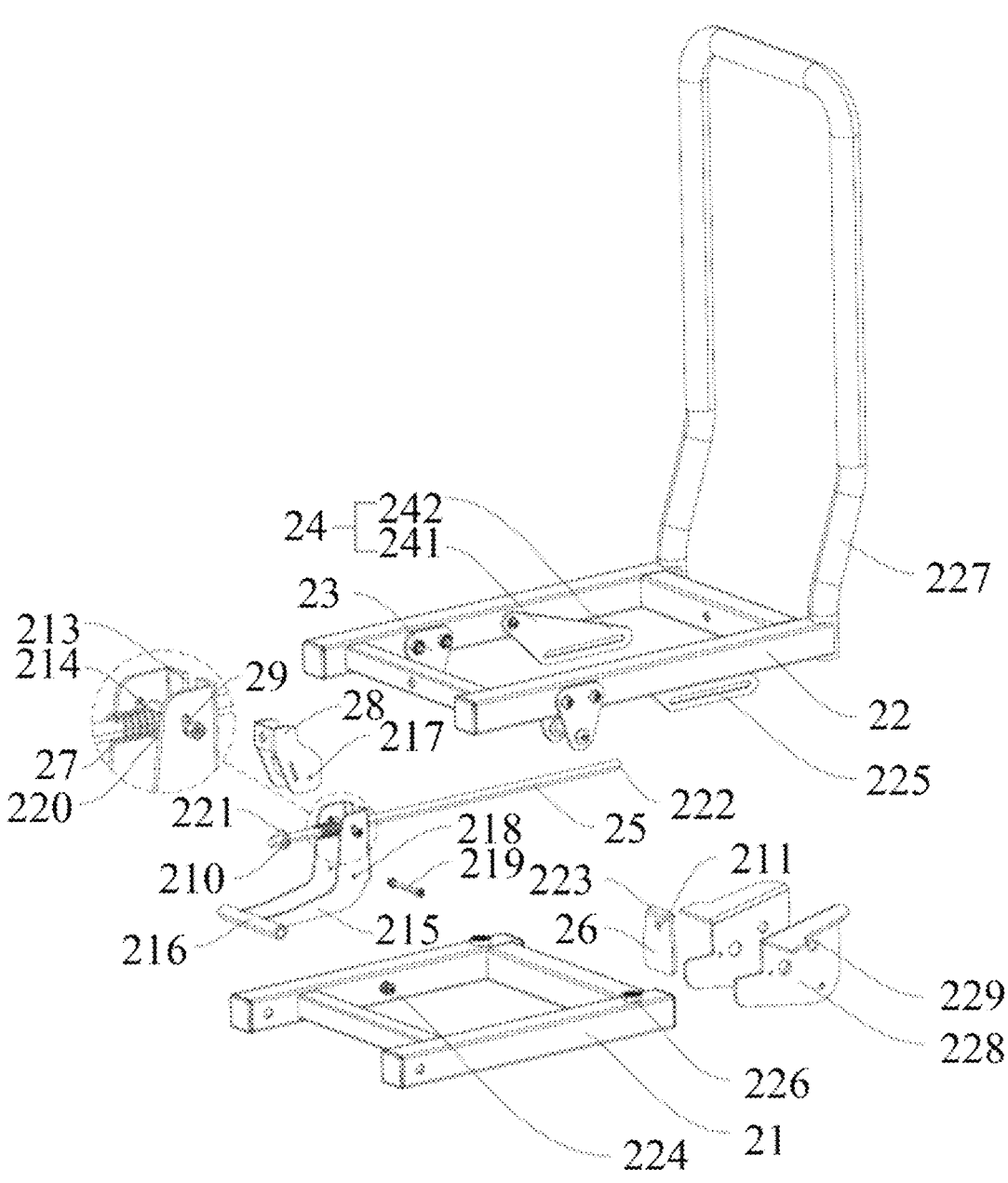
FIG. 8 is an exploded structural view of the flip locking device.
Figure 9:
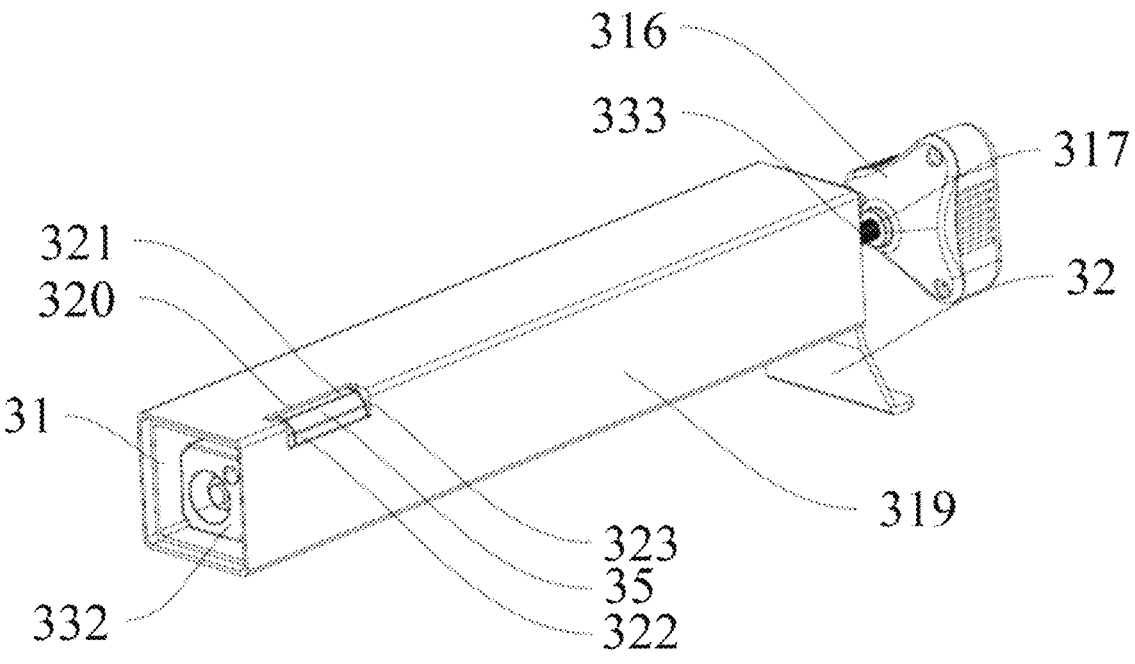
FIG. 9 is a schematic structural view of a square-mouth connection device.
Figure 10:
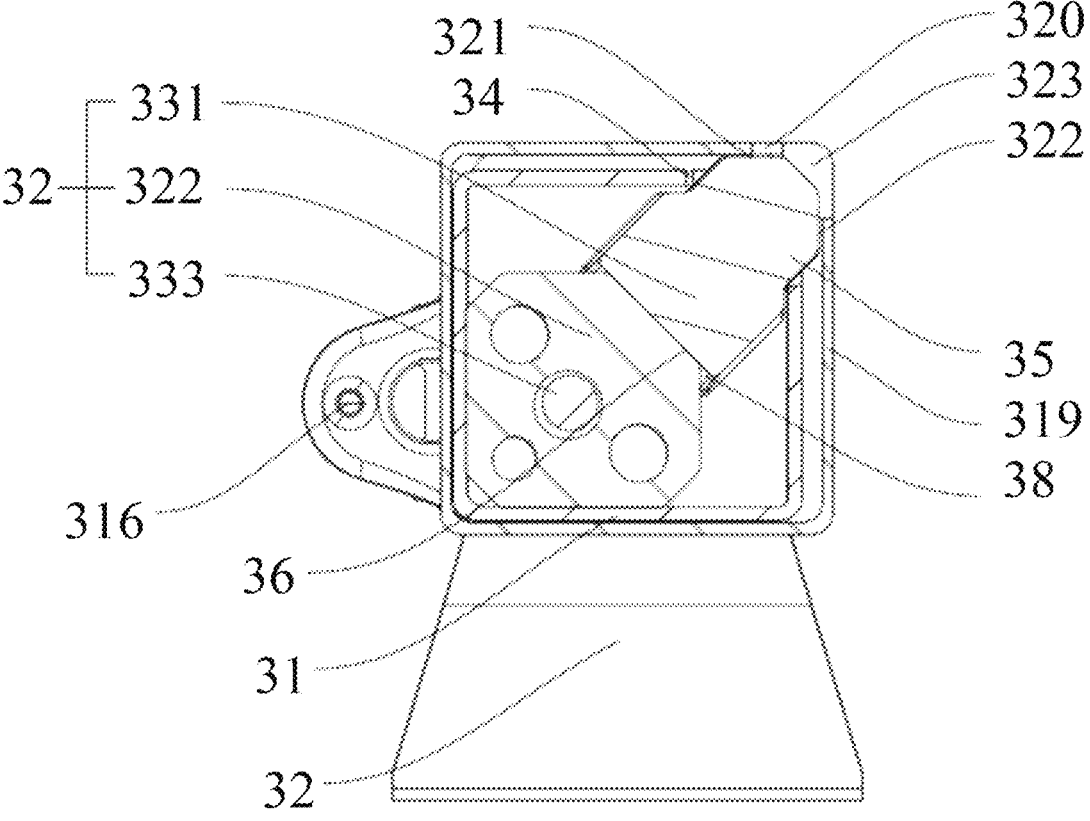
FIG. 10 is a structural cross-sectional view of the square-mouth connection device when the locking part is in a locking position.

Refer to FIGS. 1 and 2, the present invention provides an integrated vehicle rack, including a plastic wheel support 10 for supporting the bicycle wheels, a flip locking device 20 for flipping the plastic wheel support 10, and a square-mouth connecting device 30 for connecting to an external vehicle, wherein the plastic wheel support 10 and the square-mouth connecting device 30 are both connected to the bottom of the flip locking device 20.

The integrated vehicle rack is a new type of trailer rack. The plastic wheel support 10 is made of lightweight and durable materials, easy to assemble and disassemble quickly with a simple structural design, and significantly improves the installation efficiency. At the same time, plastic materials are cheaper than traditional metal materials and have good corrosion resistance, which reduces maintenance costs and overall costs during the service life. This design not only simplifies the production process, but also effectively controls the manufacturing cost, so that the plastic wheel support 10 achieves a good balance between economy and practicality while ensuring the supporting performance. It should be noted that in order to fix the bicycle more effectively, in addition to the key component of plastic wheel support 10, the integrated vehicle rack can also be equipped with auxiliary fixing equipments such as straps or wraps. These auxiliary equipments can prevent the bicycle from shaking or slipping during transportation, improve the overall stability, and ensure that the bicycle is safely and reliably fixed on the integrated vehicle rack, thereby enhancing the safety and convenience of use.

Referring to FIGS. 3 to 8, the plastic wheel support 10 can be connected to the bottom of the flip locking device 20 by mechanical connection methods such as screws, bolts, rivets, pins or snaps to ensure the stability and reliability of the connection and facilitate installation and maintenance. It should be noted that FIGS. 3 to 8 only show the specific structure of the flip locking device 20, and do not show the specific mechanical connection components between the flip locking device 20 and the plastic wheel support 10.

The flip locking device 20 comprises a lower bracket 21, an upper bracket 22, a flip structure and a locking structure. A fixing structure is provided on one side of the lower bracket 21, the fixing structure is composed of two fixing plates 228, the fixing plates 228 are provided with fixing holes 229, and the fixing plates 228 are connected to the rear of the vehicle by bolts and the fixing holes 229.

The flip structure includes two first hinges 23 and two second hinges 24, the first hinge 23 are composed of two triangular plates, the two first hinges 23 are respectively fixed to the two sides of the first end of the upper bracket 22 by bolts, the first hinges 23 are hinged to the first end of the lower bracket 21. The second end of the upper bracket 22 is provided with a U-shaped vertical rod 227, the user can drive the upper bracket 22 to fold or unfold on the lower bracket 21 by grasping the U-shaped vertical rod 227.

Each of the second hinge 24 includes a connecting part 241 and a moving part 242, the two connecting parts 241 are hinged to the middle of the upper bracket 22 and are symmetrically arranged, two moving members 224 are symmetrically arranged inside the lower bracket 21, and each of the moving parts 242 is provided with a moving groove 225 for sliding connection of the moving member 224 along the length direction. When the upper bracket 22 is turned outward, the upper bracket 22 is hinged on the lower bracket 21 through the first hinges 23 until the inner groove wall of the moving groove 225 is contacted with the moving member 224, the moving groove 225 prevents the upper bracket 22 from continuing to move, the second hinges 24 cooperates with the moving members 224 to limit the flipping action of the upper bracket 22 on the lower bracket 21.

The first end of the moving groove 225 is close to the connecting part 241, when the moving member 224 is contacted with the first end of the moving groove 225, the upper bracket 22 and the lower bracket 21 are in an unfolded state;

The second end of the moving groove 225 is away from the connecting part 241, when the moving member 224 is contacted with the second end of the moving groove 225, the upper bracket 22 and the lower bracket 21 are in a folded state.

The locking structure includes a latch 25, a locking member 26 and a holding mechanism 27, a mounting support 28 is provided at the first end of the upper bracket 22, the latch 25 penetrates the upper bracket 22 and the mounting support 28, a first limiting column 29 is provided at the latch 25 corresponding to the mounting support 28, the locking member 26 is provided at the second end of the upper bracket 22 and is disposed between the two fixing plates 228, a first locking hole 211 is passed through the locking member 26, the holding mechanism 27 is a spring member, the holding mechanism 27 is sleeved on the latch 25, a first contact ring 220 is sleeved at the latch 25 corresponding to the first limiting column 29 and the mounting support 28, the two ends of the holding mechanism 27 are respectively contacted with the mounting support 28 and the first contact ring 220, the holding mechanism 27 acts between the first limiting column 29 and the mounting support 28, in order to make the latch 25 extend outward from the second end of the upper bracket 22 and be inserted into the first locking hole 211. A second limiting column 210 is provided at the first end of the latch 25 exposed from the upper bracket 22, a second contacting ring 221 is sleeved between the second limiting column 210 of the latch 25 and the first end of the lower bracket 21, the second second contact ring ring 221 abuts against the side wall of the first end of the upper bracket 22 to limit the lateral movement of the latch 25 and prevent the end of the latch 25 detaching from the upper bracket 22.

The mounting support 28 is movably connected to the driving frame 212, a first rotating hole 218 is provided below the limiting waist hole 214 of the driving frame 212, the bottom of the mounting support 28 is provided with a second rotating hole 217, a rotating shaft 219 is rotatably connected between the mounting support 28 and the driving frame 212, and the rotating shaft 219 is rotatably connected within the first rotating hole 217 and the second rotating hole 218, in order to guide the driving frame 212 to rotate along the circumferential direction of the rotating shaft 219. The top of the driving frame 212 is provided with a through movable groove 213 for the moving of latch 25, both sides of the driving frame 212 is provided with a through limiting waist hole 214, both ends of the first limiting column 29 are movably connected within the two limiting waist holes 214 respectively.

The end of the latch 25 inserted into the first locking hole 211 is formed with an inclined surface 222, a guide surface 223 is provided on the top of the locking member 26, and the guide surface 223 is inclined toward the upper bracket 22 and fits with the inclined surface 222. When the upper bracket 22 is closed with the lower bracket 21, the latch 25 moves with the upper bracket 22, the inclined surface 222 fits and contacts with the guide surface 223, guiding the inclined surface 222 to move downward along the guide surface, so that the latch 25 drives the first limiting column 29 to move closer to the mounting support 28. The limiting column 29 drives the first contact ring 220 to apply pressure to the holding mechanism 27 to deform it, until the end of the latch 25 is corresponded to the first locking hole 211, the holding mechanism 27 recovers and drives the first limiting column 29 to telescope along the length direction, so that the latch 25 extends outward along the side away from the mounting support 28 and is inserted into the first locking hole 211, maintaining the state of the latch 25 inserted into the first locking hole 211, preventing the latch 25 from slipping out of the first locking hole 211, thereby locking the folded state of the upper bracket 22 and the lower bracket 21.

A driving part 215 is formed at the bottom of the driving frame 212, the driving part 215 includes two bending plates, so that the driving part 215 and the driving frame 212 are in an L-shaped structure. A cylindrical foot-operated part 216 is provided between the two bending plates, and the foot-operated part 216 is provided for the user to step on, so that the user can apply pressure on the foot-operated part 216 by stepping on it with less effort, in order to drive the locking structure to unlock the upper bracket 22 and the lower bracket 21. When the user needs to open the trunk at the rear of the vehicle the user steps on the foot-operated part 216 to enable the limiting waist hole 214 to drive the first limiting column 29 to move in the limiting waist hole 214, the first limiting column 29 overcomes the effect of the holding mechanism 27, and the latch 25 telescopes along the length direction and approaches one side of the mounting support 28, so that the latch 25 is pulled out of the first locking hole 211 to unlock the upper bracket 22 and the lower bracket 21, in this way, the user can flip the upper bracket 22 outward and unfold the upper bracket 22 to provide space for the opening of the trunk door. In this process, the user can lock or unlock the upper bracket 22 and the lower bracket 21 without using tools, which is convenient to operate and improves the user experience.

Two buffer members 226 are symmetrically arranged on the top of the lower bracket 21, and the buffer members 226 are made of rubber material with good elasticity. When the upper bracket 22 and the lower bracket 21 are in a folded state, the top surface of the buffer member 226 is contacted with the bottom surface of the upper bracket 22, in order to buffer the impact force when the upper bracket 22 is closed toward the lower bracket 21. At this time, the upper bracket 22 and the lower bracket 21 are parallel, so that the user can load bicycles, luggage and other items on the upper bracket 22.

Referring to FIGS. 9 to 14, the square-mouth connection device 30 can be connected to the bottom of the flip locking device 20 by mechanical connection methods such as screws, bolts, rivets, pins or buckles to ensure the stability and reliability of the connection and facilitate installation and maintenance. It should be noted that FIGS. 9 to 14 only show the specific structure of the square-mouth connection device 30, and do not show the specific mechanical connection components between the square-mouth connection device 30 and the flip locking device 20.

The square-mouth connecting device 30 comprises a square-mouth tube 319 and a connecting device. The square-mouth tube 319 and the connecting device are respectively disposed on the trailer towbar of the car (the trailer towbar of the car is a square trailer opening installed at the rear of the car, which is used to connect the trailer rack. Its main function is to bear the traction of the trailer rack, ensure the stable connection between the trailer rack and the car, so as to achieve the safe transportation of auxiliary equipment such as a bicycle rack or a luggage) and the flip locking device 20. The diagonal part of the square-mouth tube 319 is provided with a second locking hole 320 for locking with the connecting device, the connecting device comprises an connecting tube 31, a mounting bracket 32 and a locking mechanism 33, the first end of the connecting tube 31 is connected to the mounting bracket 32, the first end of the connecting tube 31 is symmetrically provided with two limiting parts 37, the two limiting parts 37 are respectively contacted with the mounting bracket 32, so as to guide the connecting tube 31 to be connected to the mounting bracket 32 in the correct position, which are convenient for the welding and fixing the connecting tube 31 and the mounting bracket 32.

The connecting tube 31 is a square tube structure, a moving square hole 34 is formed at the second end of the connecting tube 31, and the moving square hole 34 is formed at any diagonal position of the inner wall of the connecting tube 31. The locking mechanism 33 includes a first expansion block 332, a second expansion block 331 and a driving rod 333.

The other diagonal position of the inner wall of the connecting tube 31 relative to the moving square hole 34 is in contacted with the first expansion block 332, the first expansion block 332 is slidably connected to the connecting tube 31 and is rotatably connected to the driving rod 333, the mounting bracket 32 is penetrated by a through hole 39, and a driving nut 310 for threading the driving rod 333 is disposed in the through hole 39, so that the locking part 35 can be telescopically moved in the moving square hole 34. A hand wheel 316 is provided at the end of the driving rod 333 away from the first expansion block 332, when using the square-mouth connection device 30, the connecting tube 31 is contacted with the mounting bracket 32, the user only needs to rotate the hand wheel 316 to drive the driving rod 333 to rotate circumferentially. Under the threaded connection between the driving nut 310 and the driving rod 333, the driving rod 333 drives the first expansion block 332 to slide along the length direction in the connecting tube 31, so that the first expansion block 332 is close to or away from the second expansion block 331.

The first expansion block 332 is provided with a first inclined plane 38, and the second expansion block 331 is provided with a second inclined plane 36 and a locking part 35, the first inclined plane 38 is fitted with the second inclined plane 36 against each other, and the first inclined plane 38 and the second inclined plane 36 are parallel to the diagonal line of the moving square hole 34 corresponding to the inner cavity section of the square-mouth tube 319. When the first expansion block 332 approaches or moves away from the second expansion block 331, the locking part 35 can be switched between the locking position and the unlocking position through the fitting of the second inclined plane 36 and the first inclined plane 38. The inner wall of the moving square hole 34 is provided with two guide plates 311, the two sides of the locking part 35 are respectively in contacted with the two guide plates 311, the two guide plates 311 are used to guide the insertion or disengagement of the locking part 35 in the moving square hole 34.

Figure 11:
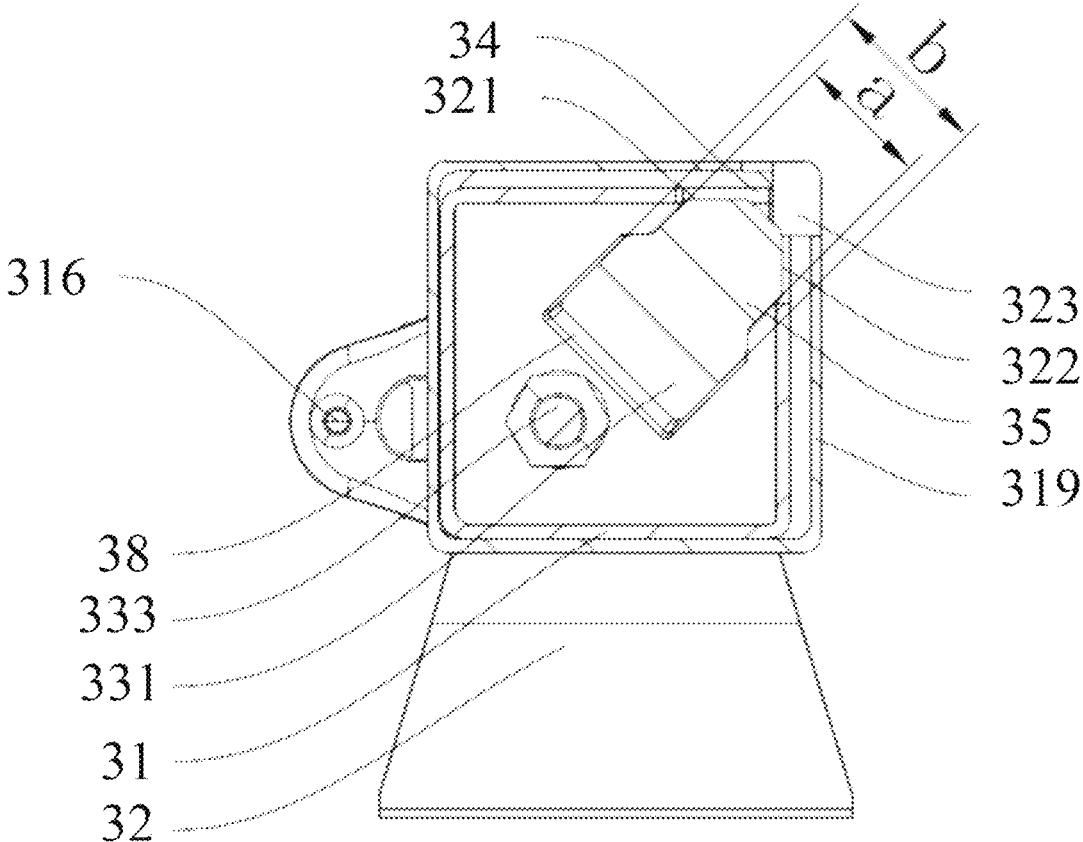
FIG. 11 is a structural cross-sectional view of the square-mouth connection device when the locking part is in an unlocked position.
Figure 12:
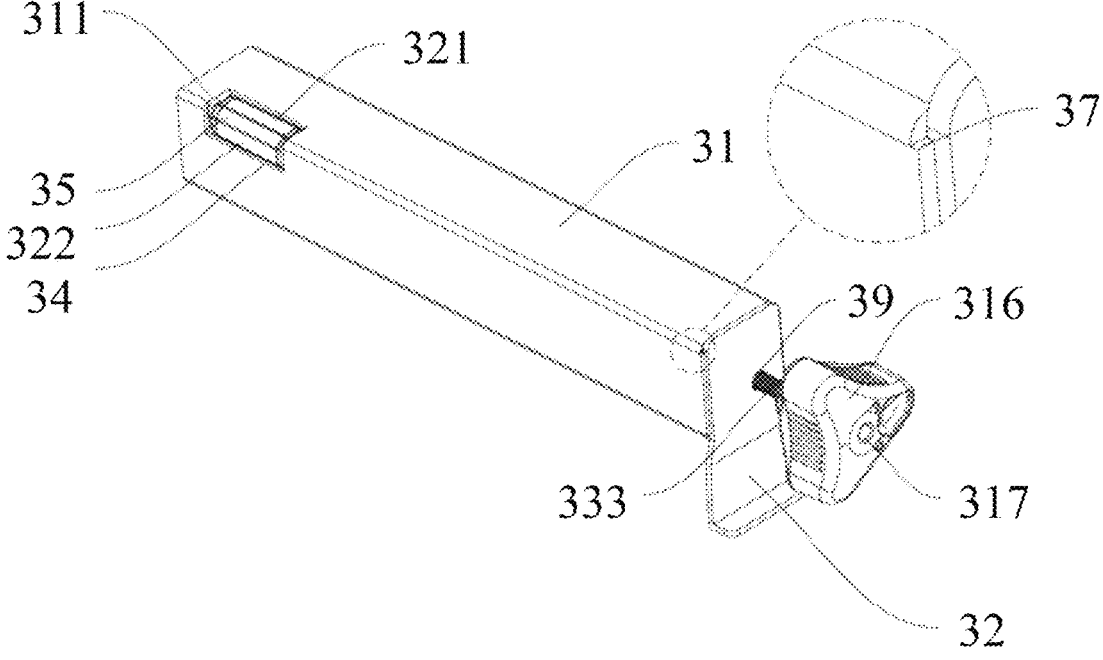
FIG. 12 is a schematic structural view of the connecting device.
Figure 13:
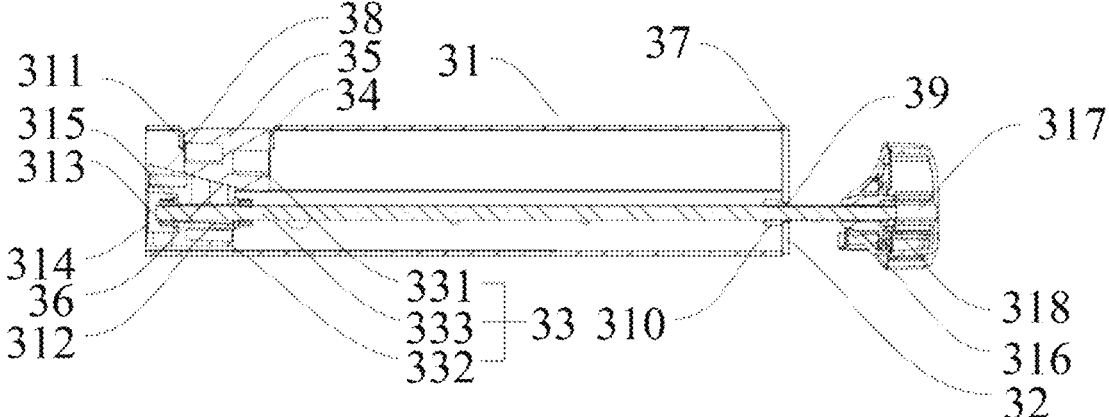
FIG. 13 is a cross-sectional view of FIG. 12.
Figure 14:
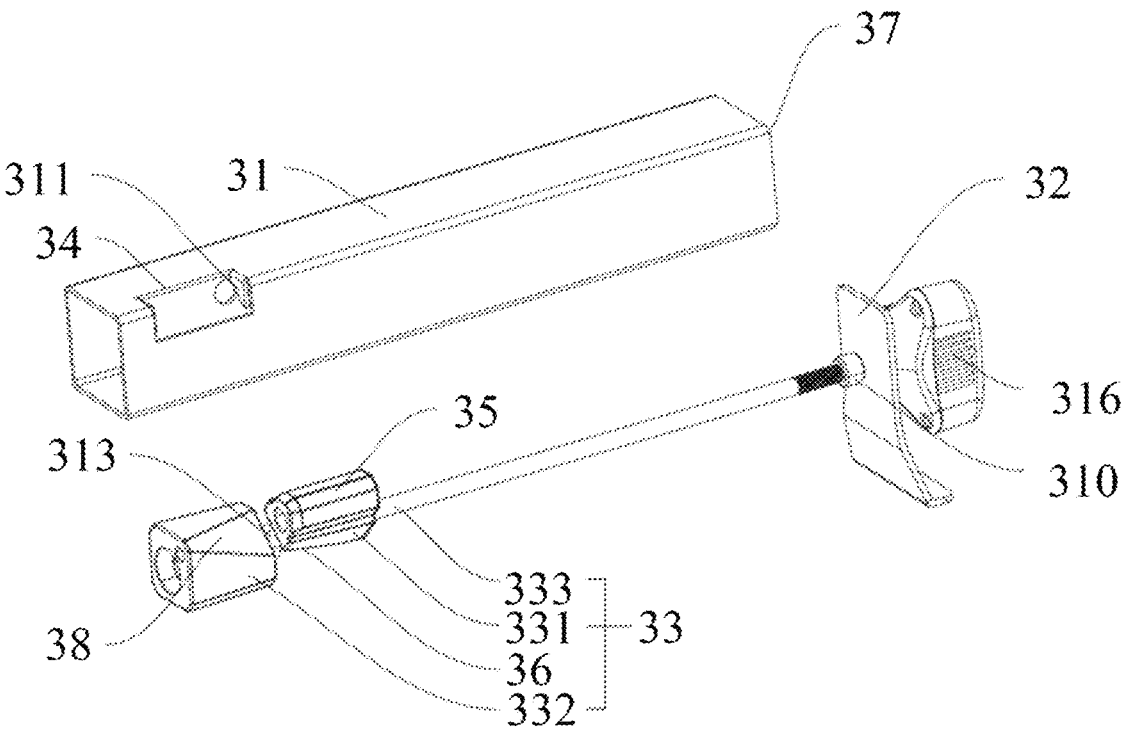
FIG. 14 is an exploded structural view of the connecting device.

With reference to FIG. 11, when the first expansion block 332 approaches the second expansion block 331, the first expansion block 332 pushes the second expansion block 331, so as to drive the locking part 35 to disengaged from the moving square hole 34 into the second locking hole 320. The width of the moving square hole 34 is a, and the width of the second expansion block 331 is b, where a is smaller than b.

The second expansion block 331 is contacted with the inner wall of the connecting tube 31 to limit the extension degree of the locking part 35, so that the locking part 35 stops when it is in the locked position. The portion of the locking part 35 exposed from the moving square hole 34 is provided with a horizontal surface 321 and a vertical surface 322 perpendicular to each other, both the horizontal surface 321 and the vertical surface 322 are contacted with the inner wall of the square-mouth tube 319, the inner wall of the second locking hole 320 is symmetrically provided with two locking plates 323, the opposite sides of the two locking plates 323 are contacted with the locking part 35 to prevent the square-mouth tube 319 detaching from the connecting tube 31.

The position of the second expansion block 331 is limited in the connecting tube 31 through the mutual cooperation between the moving square hole 34 and the two guide plates 311, so that the second expansion block 331 and the first expansion block 332 form a diagonal tension. At this time, the inner wall of the square-mouth tube 319 is respectively pressed against the horizontal surface 321 and the vertical surface 322, the inner wall of the square-mouth tube 319 is subjected to tension in the vertical and horizontal directions, in this way, the inner wall of the square-mouth tube 319 is tightly connected to the outer wall of the connecting tube 31, and cooperates with the two locking plates 323 to limit the locking part 35, so as to realize the close connection between the square-mouth tube 319 and the connecting device, which is not easy to loosen, greatly improving the stability of the connecting device and reducing safety hazards;

When the first expansion block 332 moves away from the second expansion block 331, the second expansion block 331 moves downward along the first inclined plane 38, so as to drive the locking part 35 to disengaged from the second locking hole 320 and return to the inner cavity of the connecting tube 31. The locking part 35 is in the unlocking position, the locking part 35 disengages from the second locking hole 320 and is completely separated from the locking plates 323, further to unlock the square-mouth tube 319 and the connecting device, thereby realizing the rapid separation of the square-mouth tube 319 and the connecting device.

When the square-mouth connection device 30 needs to be disassembled and assembled, the user only needs to rotate the hand wheel 316 without tools, which is convenient to operate and improves the convenience of disassembly and assembly under limited outdoor conditions.

The first expansion block 332 is provided with a third rotating hole 312 for the rotatably connection of the driving rod 333, and an end surface of the first expansion block 332 is provided with a mounting groove 314, which is connected with the rotation hole 312. Two limiting members 313 are provided at two openings of the third rotating hole 312 corresponding to the driving rod 333, the two limit members 313 can be welded and fixed on the driving rod 333 to limit the driving rod 333, so as to prevent the driving rod 333 from axial displacement during the rotation process. Each of the limiting member 313 is further provided with a gasket 315 sleeved on the driving rod 333, the two gaskets 315 are respectively in contacted with the side wall of the second expansion block 331 and the inner groove wall of the mounting groove 314, the outer diameter of the gasket 315 is larger than the inner diameter of the third rotating hole 312, so as to increase the contact area of the limiting member 313 and reduce the pressure, thereby ensuring that the driving rod 333 rotates smoothly in the third rotating hole 312. The limiting member 313 can be a nut, which is threadedly connected to the driving rod 333 to achieve a detachable connection between the first expansion block 332 and the second expansion block 331, and the gasket 315 is used to prevent the nut from loosening.

The hand wheel 316 is a triangular hollow structure, an adjustment hole 317 is provided on the hand wheel 316 for the moving of driving rod 333, an adjusting nut 318 is provided in the adjusting hole 317, and the driving rod 333 screwed out of the end of the mounting bracket 32 and is threadedly connected with the adjusting nut 318. The user can adjust the length of the driving rod 333 exposed from the hand wheel 316 by screwing the driving rod 333 in or out of the adjusting nut 318, thereby adjusting the preload force between the first expansion block 332 and the second expansion block 331 when the square-mouth tube 319 and the connecting device are locked according to actual needs.

Hereinafter, embodiments of the present invention have been described in detail with reference to the accompanying drawings. While the description above refers to the particular embodiments of the present invention, it will be understood that many modifications may be made without departing from the spirit thereof. Any equivalent replacement or modification would fall within the protection scope of the present invention.

What is claimed is:

1. An integrated vehicle rack, including a plastic wheel support, a flip locking device for flipping the plastic wheel support, and a square-mouth connecting device for connecting to an external vehicle, and the plastic wheel support and the square-mouth connecting device both connected to a bottom of the flip locking device;

wherein the flip locking device comprises a lower bracket, an upper bracket, a flip structure and a locking structure; wherein one end of the upper bracket is hinged to one end of the lower bracket through the flip structure, the locking structure comprises a latch and a locking member, the latch is provided through two ends of the upper bracket, the locking member is arranged at one end of the upper bracket, the locking member is provided with a first locking hole for the latch to be inserted, the latch is provided with a first limiting column, one end of the upper bracket is movably connected to a driving frame, a top of the driving frame is provided with a movable groove for the latch to move, both sides of the driving frame are provided with a through limiting waist hole for the first limiting column to be movably connected, a driving part is formed at a bottom of the driving frame, so as to enable the first limiting column to drive the latch to move telescopically in the length direction, and the upper bracket and the lower bracket can be locked or unlocked by the cooperation of the latch and the first locking hole, the driving part comprising two bending plates, the driving frame and the driving part being in an L-shaped structure, a foot-operated part being provided between the two bending plates;

wherein the square-mouth connecting device comprises a square-mouth tube and a connecting device; wherein a second locking hole is provided at a diagonal of the square-mouth tube, the connecting device comprises an connecting tube, a mounting bracket and a locking mechanism, one end of the connecting tube is connected to the mounting bracket, the other end of the connecting tube is provided with a moving square hole, the locking mechanism comprises a first expansion block, a second expansion block and a driving rod, the first expansion block is provided with a first inclined plane, the second expansion block is provided with a second inclined plane and a locking part, the first inclined plane and the second inclined plane are fitted with each other, the first expansion block is slidably connected in the connecting tube and is rotatably connected to the driving rod, the mounting bracket is provided with a driving nut for threading the driving rod to drive the locking part to be telescopically moved in the moving square hole, the portion of the locking part exposed from the moving square hole is provided with a horizontal plane and a vertical plane perpendicular to each other, both the horizontal plane and the vertical plane are contacted with the inner wall of the square-mouth tube, the inner wall of the second locking hole is symmetrically provided with two locking plates, and opposite sides of the two locking plates are contacted with the locking part.

2. The integrated vehicle rack according to claim 1, wherein the flip structure includes two first hinges and two second hinges, the two first hinges are respectively fixed to two sides of one end of the upper bracket by bolts, the first hinges are hinged to one end of the lower bracket, each of the second hinge includes a connecting part and a moving part, the two connecting parts are hinged to a middle part of the upper bracket and are symmetrically arranged, the middle part of the lower bracket is symmetrically arranged with two moving members, and each of the moving members is provided with a moving groove for the sliding connection of the moving member along the length direction.

3. The integrated vehicle rack according to claim 1, wherein a mounting support and a rotating shaft are provided at one end of the upper bracket, the latch is provided on the mounting support, a first rotating hole is provided below the limiting waist hole of the driving frame, a second rotating hole is penetrated through the bottom of the mounting support, and the rotating shaft is rotatably connected to the first rotating hole and the second rotating hole; and the locking structure further includes a holding mechanism, which acts between the first limiting column and the mounting support, in order to make the latch extend outward from the other end of the upper bracket and be inserted into the locking hole; the said holding mechanism is a spring member and is sleeved on the latch, a first contact ring is sleeved at the latch corresponding to the first limiting column and the mounting support, and two ends of the holding mechanism are respectively contacted with the mounting bracket and the first contact ring.

4. The integrated vehicle rack according to claim 1, wherein the first inclined plane and the second inclined plane are parallel to a diagonal line of the moving square hole corresponding to the inner cavity section of the square-mouth tube, the connecting tube is a square tube structure, the moving square hole is provided at any diagonal position of the inner wall of the connecting tube, the other diagonal position of the inner wall of the connecting tube relative to the moving square hole is in contact with the first expansion block, the inner wall of the moving square hole is provided with two guide plates, and two sides of the locking part are respectively in contact with the two guide plates.

5. The integrated vehicle rack according to claim 1, wherein the first expansion block is provided with a third rotating hole for the rotatably connection of the driving rod, two limiting members are provided at two openings of the third rotating hole corresponding to the driving rod, a mounting groove is provided on a side wall of the first expansion block away from the mounting bracket, the mounting groove is connected with the rotating hole, each of the limiting members is provided with a gasket sleeved on the driving rod, the two gaskets are respectively in contact with the side wall of the second expansion block and the inner groove wall of the mounting groove, and the outer diameter of the gasket is larger than the inner diameter of the third rotating hole.

\* \* \* \* \*